United States Patent Office 3,236,856
Patented Feb. 22, 1966

3,236,856
IMIDAZOLE DERIVATIVES
Edgar William Parnell, Romford, Essex, England, assignor to May & Baker Limited, Dagenham, Essex, England
No Drawing. Filed Oct. 25, 1963, Ser. No. 318,815
Claims priority, application Great Britain, Oct. 30, 1962, 41,085/62
11 Claims. (Cl. 260—309)

This invention relates to new imidazole derivatives of therapeutic utility, to a process for their preparation and to pharmaceutical compositions containing them.

According to the present invention, there are provided the new imidazole compounds of the formula:

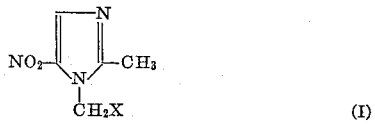

wherein X represents one of the groups —CN, —COOR$_1$ or —CONR$_2$R$_3$, in which R$_1$ represents a hydrogen atom or a lower alkyl group, which may carry an amino (including mono- and di-alkylamino) substituent, or a cycloalkyl (preferably cyclohexyl), benzyl or phenyl group, R$_2$ represents a hydrogen atom or a lower alkyl, lower hydroxylalkyl or phenyl group, or a mononuclear, 5- or 6-membered nitrogen containing heterocyclic group attached through a carbon atom (preferably 2-pyridyl, 2-pyrimidyl or 2-thiazolyl), and R$_3$ represents a hydrogen atom or a lower alkyl or lower hydroxyalkyl group, and derivatives thereof, including acid addition salts, and where X is a carboxylic acid grouping, salts with alkali metals, ammonia and amines. The term "lower" is used in this specification and accompanying claims to denote that the alkyl or hydroxyalkyl group referred to contains not more than 6 carbon atoms.

The aforesaid imidazole compounds possess valuable therapeutic properties, particularly antiprotozoal activity, for example against trichomoniasis. Preferred compounds are those of Formula I in which X represents the amide grouping —CONR$_2$R$_3$ and, in particular, 2-methyl-5 - nitroimidazol - 1 - yl - N,N - dimethylacetamide, 2-methyl-5-nitroimidazol-1-ylacetic acid anilide, 2-methyl-5 - nitroimidazol - 1 - ylacetamide, 2 - methyl - 5 - nitro-imidazol-1-yl-N-methylacetamide and 2-methyl-5-nitro-imidazol - 1 - yl - N - (β - hydroxyethyl)acetamide—the first mentioned compound being of outstanding importance—and acid addition salts thereof.

According to a feature of the invention, the imidazole compounds of Formula I are prepared by the oxidation of a nitroimidazole of the formula:

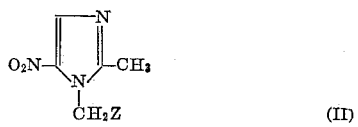

(wherein Z represents a —CH$_2$OH or —CHO grouping) by methods known per se for the oxidation of alcohols and aldehydes to carboxylic acids, followed if necessary by conversion of the acid substituent —CH$_2$COOH in the 1-position of the resultant imidazole product to a grouping —CH$_2$CN, —CH$_2$COOR$_1'$ or —CH$_2$CONR$_2$R$_3$, in which R$_2$ and R$_3$ are as hereinbefore defined, and R$_1'$ has the same significance as R$_1$ as hereinbefore defined except for a hydrogen atom. Oxidation of the Z group in the nitroimidazole starting material may be effected, for example, by reaction with chromic acid or a permanganate, such as potassium permanganate.

The acid substituent —CH$_2$COOH in 2-methyl-5-nitro-imidazol-1-ylacetic acid obtained on oxidation of the nitroimidazole starting materials of Formula II may be converted by methods known per se to a grouping —CH$_2$CN, —CH$_2$COOR$_1'$ or —CH$_2$CONR$_2$R$_3$ in order to obtain other products within the scope of Formula I. Thus, the aforesaid acid may be esterified by reaction with an alcohol in the presence of a condensing agent, such as sulphuric acid, or converted to the acid chloride by reaction with thionyl chloride or phosphorus pentachloride and the acid chloride reacted with an alcohol, to give desired esters (i.e., X=COOR$_1'$) of Formula I. Alternatively the acid chloride may be reacted with a suitable amine to produce an amide conforming to Formula I. The amides may also be prepared by reaction of esters of the acid with appropriate amines. The amide of 2-methyl-5-nitroimidazol-1-ylacetic acid may also be dehydrated, e.g., by treatment with phosphorus oxychloride, to give the corresponding acetonitrile.

The intermediates of Formula II, in which Z represents a —CH$_2$OH grouping, may be prepared according to known methods. The intermediates of Formula II, in which Z represents a —CHO grouping, may be prepared by oxidation of the corresponding alcohols of Formula II, wherein Z represents a —CH$_2$OH grouping, or an ethylenic unsaturated hydrocarbon of the formula:

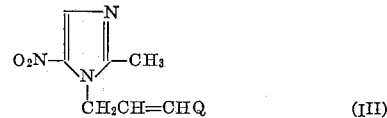

wherein Q represents a hydrogen atom, or a lower alkyl or aryl group. In the latter case, involving oxidation of an ethylenically unsaturated hydrocarbon of Formula III, the aldehyde produced need not be isolated, but may be converted directly to an acid of Formula I. The aldehydes of Formula II, i.e., where Z represents a —CHO grouping, may also be prepared by hydrolysis of an acetal of the formula:

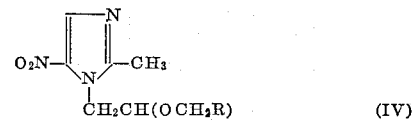

(wherein R represents a hydrogen atom or a lower alkyl group) according to methods known per se for the hydrolysis of acetals. The acetals of Formula IV may themselves be conveniently prepared by the reaction of 2-methyl-4(or 5)-nitroimidazole with a compound of the formula HalCH$_2$CH(OCH$_2$R)$_2$, wherein Hal represents a halogen atom, and R is as hereinbefore defined.

By the term "methods known per se" as used in this specification and accompanying claims is meant methods heretofore used or described in the chemical literature.

When the imidazole compounds of Formula I are used for therapeutic purposes in the form of their salts, it should be understood that only those such salts should in practice be employed as contain anions or radicals that are relatively innocuous to the animal organism when used in therapeutic doses so that the beneficial physiological properties inherent in the parent compounds are not vitiated by side-effects ascribable to those anions or radicals; in other words, only non-toxic salts are contemplated. Suitable acid addition salts are those derived from strong acids and include hydrohalides (for example, hydrochlorides), phosphates, sulphates, methanesulphonates, isethionates and ethane disulphonates. These salts may be made from the bases of Formula I by the methods heretofore used in the art for making acid addition salts. For example, the acid addition salts may be made by mixing the required base with an equivalent quantity of a non-toxic acid in a solvent and isolating the resultant salt by filtration after, if necessary, evaporation of part or all of the solvent. They may be purified by crystallisation or by any other method commonly used in the art.

Alkali metal, ammonium and amine salts derived from the acids of Formula I (i.e., X=COOH) may be prepared in a similar manner to those described above for the acid addition salts.

The following examples illustrate the production of 5-nitroimidazole derivatives according to the invention.

*Example I*

A solution of chromic acid (5.4 ml.) [prepared from chromium trioxide (54 g.) and concentrated sulphuric acid (47 ml.) and made up with water to 200 ml.] was added dropwise to a suspension of 1-2'-hydroxyethyl-2-methyl-5-nitroimidazole (1.51 g.) in hot water (15 ml.). An exothermic reaction occurred and the solution boiled. When this had subsided the green solution was heated for 5 minutes on the steam bath, then cooled and repeatedly extracted with boiling ethyl acetate. The combined extracts were dried and evaporated giving the crude acid (0.9 g.), which was recrystallised from ethanol-light petroleum (B.P. 40–60° C.), affording 2-methyl-5-nitroimidazol-1-ylacetic acid, M.P. 176–178° C.

*Example II*

2-methyl-5-nitroimidazol-1-ylacetic acid (0.5 g.) (prepared as described in Example I) and phosphorus pentachloride (0.63 g.) were mixed and heated on the steambath for 1 hour. The phosphorus oxychloride produced was removed by distillation under reduced pressure and the residue triturated with light petroleum. The resultant solid was added to aniline (1.5 ml.) in benzene (4.5 ml.), the mixture refluxed for 15 minutes, and then steam distilled to remove excess of benzene and aniline. The solid product was filtered off and recrystallised from ethanol giving 2-methyl-5-nitroimidazol-1-ylacetic acid anilide, M.P. 186–187° C.

By proceeding as described above but replacing the aniline by 2-aminopyridine, there was obtained 2-methyl-5-nitroimidazol-1-yl-N-2'-pyridylacetamide, M.P. 176° C.

*Example III*

A solution of chromic acid (105 ml.) [prepared from chromium trioxide (54 g.) and concentrated sulphuric acid (47 ml.) and made up with water to 200 ml.] was added dropwise to a suspension of 1-2'-hydroxyethyl-2-methyl-5-nitroimidazole (34 g.) in hot water (340 ml.). After the exothermic reaction had subsided, the solution saturated with sodium chloride and heated to 75° C. The heated mixture was continuously extracted for 16 hours with ethyl acetate. Evaporation of the ethyl acetate solution gave the crude acid (15 g.), which was crystallised from ethanol/light petroleum (B.P. 60–80° C.) to give 2-methyl-5-nitroimidazol-1-ylacetic acid (12.0 g.; 33%), M.P. 176–178° C.

*Example IV*

Thionyl chloride (8.3 ml.) was added over 3 minutes to 2-methyl-5-nitroimidazol-1-ylacetic acid (prepared as described in Example III) (10.6 g.). The resulting mixture was heated on a steam-bath for 10 minutes and excess thionyl chloride then removed by distillation under reduced pressure (35 mm. Hg). The residue was heated under reflux for 15 minutes with methanol (25 ml.). The excess methanol was removed under reduced pressure and the residue treated with 8% aqueous sodium bicarbonate solution (75 ml.). The solid which separated was collected and washed with water (30 ml.) and dried to constant weight to give methyl 2-methyl-5-nitroimidazol-1-ylacetate (10.6 g.), M.P. 140° C. (after recrystallisation from water).

*Example V*

Proceeding as described in Example IV, 2-methyl-5-nitroimidazol-1-ylacetyl chloride is prepared from 2-methyl-5-nitroimidazol-1-ylacetic acid (15.7 g.). This acid chloride was heated under reflux for 12 minutes with ethanol (25 ml.) and then treated as described in Example IV. Ethyl 2-methyl-5-nitroimidazole-1-ylacetate (16.2 g.) was obtained as a light coloured crystalline power, M.P. 71° C. (after recrystallisation from isopropanol).

*Example VI*

Proceeding as described in Example IV, 2-methyl-5-nitroimidazol-1-ylacetyl chloride was prepared from 2-methyl-5-nitroimidazol-1-ylacetic acid (13.7 g.). This acid chloride was heated at 100–115° C. for 5 minutes with n-butanol (36 ml.) and then treated as described in Example IV. n-Butyl 2-methyl-5-nitroimidazol-1-ylacetate (19.8 g.) was obtained as a white crystalline powder, M.P. 53° C. (after recrystallisation from cyclohexane with charcoaling).

*Example VII*

Proceeding as described in Example IV, 2-methyl-5-nitroimidazol-1-ylacetyl chloride was prepared from 2-methyl-5-nitroimidazol-1-ylacetic acid (13.9 g.). After removing excess thionyl chloride by distillation, benzene (50 ml.) was added and distilled off under reduced pressure (35 mm. Hg). The residue was treated with a further quantity of benzene (50 ml.) and the resulting suspension cooled. A solution of cyclohexanol (7.5 g.) in benzene (50 ml.) was added over 15 minutes and the resulting mixture heated for 25 minutes under reflux. The solvent was removed under reduced pressure (35 mm. Hg) and the residue treated as described in Example IV. Cyclohexyl 2-methyl-5-nitroimidazol-1-ylacetate (18 g.) was obtained as a white crystalline powder, M.P. 90° C. (after recrystallisation from cyclohexane).

*Example VIII*

Proceeding as described in Example VII, a suspension of 2-methyl-5-nitroimidazol-1-ylacetyl chloride in benzene was prepared starting with 2-methyl-5-nitroimidazol-1-ylacetic acid (14 g.). To this suspension was added over 10 minutes a solution of phenol (7.1 g.) in benzene (75 ml.) and the resulting mixture heated under reflux for 40 minutes. The reaction mixture was treated as described in Example VII to give phenyl 2-methyl-5-nitroimidazol-1-ylacetate (14.6 g.), as a white crystalline powder, M.P. 149° C.

*Example IX*

Proceeding as described in Example VII, a suspension of 2-methyl-5-nitroimidazol-1-ylacetyl chloride in benzene was prepared from 2-methyl-5-nitroimidazol-1-ylacetic acid (9.25 g.). To this suspension was added over 20 minutes a solution of pyridine (8.8 g.), benzyl alcohol (5.15 ml.) and benzene (50 ml.), the temperature being maintained below 10° C. The resulting mixture was stirred for 3½ hours and then allowed to stand for 16 hours. Distilled water (25 ml.) was then added and the mixture stirred for 1 hour. The benzene layer was separated and the aqueous layer extracted with ether (600 ml.). The organic layers were combined and dried over anhydrous potassium carbonate. After filtration, the solvent was removed and the residue recrystallised from isopropanol to give benzyl 2-methyl-5-nitroimidazol-1-ylacetate (10.9 g.) as a cream-coloured crystalline powder, M.P. 92° C.

*Example X*

Proceeding as described in Example IV, 2-methyl-5-nitroimidazol-1-ylacetyl chloride was prepared from 2-methyl-5-nitroimidazol-1-ylacetic acid (9.25 g.). This was reacted with 3-dimethylaminopropanol (30 g.) proceeding in a similar manner to that described in Example IV. The reaction residue was extracted with ether (1000 ml.) and on evaporation of this solution, the residue was recrystallised from cyclohexane to give 3-dimethylaminopropyl 2-methyl-5-nitroimidazol-1-ylacetate (11.2 g.) as a yellow crystalline powder, M.P. 64° C.

Example XI

A mixture of methyl 2-methyl-5-nitroimidazol-1-ylacetate (prepared as described in Example IV) (22.3 g.) and concentrated ammonia solution (d=0.925; 105 ml.) was heated under reflux for 5 minutes. The mixture was cooled in ice and the solid which separated collected by filtration, washed with water (20 ml.) and dried. 2-methyl-5-nitroimidazol-1-ylacetamide (13.2 g.) was obtained as a white crystalline powder, M.P. 235° C. (after recrystallisation from water with decolouration with animal charcoal.)

Example XII

To a suspension of methyl 2-methyl-5-nitroimidazol-1-ylacetate (prepared as described in Example IV) (10 g.) in water (20 ml.) was added, over 4 minutes, 30% aqueous methylamine (10 g.) at a temperature below 15° C. The mixture was stirred for 30 minutes at 15° C. then cooled to 0° C. The solid which separated was collected by filtration and washed with water (10 ml.). After recrystallisation from water, 2-methyl-5-nitroimidazol-1-yl-N-methylacetamide (7.5 g.) was obtained as a fine white powder, M.P. 223° C.

Example XIII

Proceeding as described in Example IV, 2-methyl-5-nitroimidazol-1-ylacetyl chloride was prepared from 2-methyl-5-nitroimidazol-1-ylacetic acid (18.5 g.) and the reaction residue dried under reduced pressure (35 mm. Hg). The powdered acid chloride was added during 10 minutes to dimethylamine (300 ml.) cooled to −60° C. The resulting mixture was stirred for 30 minutes and then the excess dimethylamine removed under reduced pressure (35 mm. Hg) below −10° C. The residue was added to 4N hydrochloric acid and extracted with chloroform (5 x 250 ml.). The organic layer was dried over anhydrous potassium carbonate, filtered and the solvent removed under reduced pressure (35 mm. Hg). The residue was recrystallised from benzene to give 2-methyl-5-nitroimidazol-1-yl-N,N-dimethylacetamide (15 g.) as a white powder, M.P. 162° C.

Example XIV

A mixture of 2-methyl-5-nitroimidazol-1-ylacetamide (prepared as described in Example XI) (32.1 g.) and phosphorus oxychloride (85.0 ml.) was heated at 90–95° C. for 8 hours. Excess phosphorus oxychloride was removed and the brown residue treated with ice (450 g.) and sodium bicarbonate (90 g.). The resulting mixture was stirred until the ice melted and extracted with chloroform (4 x 500 ml.). The chloroform solution was dried over anhydrous potassium carbonate, filtered and the solvent removed under reduced pressure. The residue was recrystallised from toluene to give 2-methyl-5-nitroimidazol-1-ylacetonitrile (27.8 g.) as a white powder, M.P., 93° C.

Example XV

A mixture of methyl 2-methyl-5-nitroimidazol-1-ylacetate (prepared as described in Example IV) (25 g.), ethanolamine (12 g.) and ethanol (250 ml.) was heated under reflux for 2½ hours. After this time charcoal (2 g.) was added, the mixture filtered and the filtrate cooled in ice. The solid which separated was collected, washed with ethanol (10 ml.) and dried to give 2-methyl-5-nitroimidazol-1-yl-N-(β-hydroxyethyl)-acetamide (7 g.) as a cream-coloured crystalline powder, M.P. 164° C.

The present invention includes within its scope pharmaceutical compositions which comprise, as active ingredient, at least one imidazol compound of general Formula I, or non-toxic salt thereof, in association with a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the active compounds of the invention is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavoring agents. The compositions according to the invention, for oral administration, also include capsules of absorbable material such as gelatin containing one or more of the active substances of the invention with or without the addition of diluents or excipients.

For topical application the active material may be incorporated in a suitable vehicle such as a cream, ointment, lotion or suspension, or in a pessary or ovule.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time.

The following example illustrates pharmaceutical compositions according to the invention.

Example XVI

Tablets were prepared of the formula:

| | Percent |
|---|---|
| 2-methyl-5-nitroimidazole-1-ylacetic acid | 78.4 |
| Starch | 14.2 |
| Dextrin | 5.5 |
| Sodium carboxymethylcellulose | 0.88 |
| Stearic acid | 0.6 |
| Magnesium stearate | 0.42 |

(wherein the percentages are by weight).

Similarly, there may be prepared pharmaceutical compositions in the form of tablets in which the imidazole compound specified in the preceding example is replaced by a like quantity of any other imidazole derivative within the terms of Formula I, e.g. the product of any of Examples II and IV to XV.

I claim:

1. An imidazole of the formula:

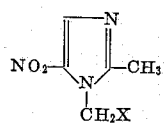

wherein X represents a member of the class consisting of —CN, —COOR₁, and —CONR₂R₃ groups, in which R₁ represents a member of the class consisting of hydrogen, alkyl, dialkylaminoalkyl, cyclohexyl, benzyl and phenyl, $R_2$ represents a member of the class consisting of hydrogen, alkyl, hydroxyalkyl, phenyl, and 2-pyridyl, and $R_3$ represents a member of the class consisting of hydrogen and alkyl, the said alkyl and hydroxyalkyl groups containing a maximum of 6 carbon atoms each, and non-toxic acid addition salts thereof and, in the case of a compound where X represents —COOH, alkali metal, ammonium and amine salts thereof.

2. 2 - methyl - 5 - nitroimidazol - 1 - yl - N,N - dimethylacetamide.

3. A non-toxic acid addition salt of 2-methyl-5-nitroimidazol-1-yl-N,N-dimethylacetamide.

4. 2-methyl-5-nitroimidazol-1-ylacetic acid anilide.

5. A non-toxic acid addition salt of 2-methyl-5-nitroimidazol-1-ylacetic acid anilide.

6. 2-methyl-5-nitroimidazol-1-ylacetamide.

7. A non-toxic acid addition salt of 2-methyl-5-nitroimidazol-1-ylacetamide.

8. 2-methyl-5-nitroimidazol-1-yl-N-methylacetamide.

9. A non-toxic acid addition salt of 2-methyl-5-nitroimidazol-1-yl-N-methylacetamide.

10. 2 - methyl - 5 - nitroimidazol - 1 - yl - N - ($\beta$ - hydroxyethyl) acetamide.

11. A non-toxic acid addition salt of 2-methyl-5-nitroimidazol-1-yl-N-($\beta$-hydroxyethyl) acetamide.

No references cited.

WALTER A. MODANCE, *Primary Examiner.*

JOHN D. RANDOLPH, *Examiner.*